United States Patent Office 3,398,150
Patented Aug. 20, 1968

3,398,150
CERTAIN 7-PHENETHYLAMINOPROPYL-
THEOPHYLLINE DERIVATIVES
Karl Heinz Klingler, Langen, Hessen, Germany, assignor to Deutsche Gold- und Silber-Scheideanstalt vormals Roessler, Frankfurt am Main, Germany
No Drawing. Filed Jan. 10, 1966, Ser. No. 519,430
Claims priority, application Germany, Jan. 16, 1965,
D 46,266
3 Claims. (Cl. 260—256)

ABSTRACT OF THE DISCLOSURE

7-{3-[2-(3,4-dihydroxyphenyl)-2-hydroxyethylamino]-propyl}-theophylline and method of producing the same by reacting 3,4-dihydroxy-ω-chloroacetophenone with 7-(γ-benzylamino-propyl)theophylline to produce 7-{3-[2-(3,4-dihydroxyphenyl-2-oxy-ethyl-benzylamino]-propyl}-theophylline and catalytically hydrogenating the latter to produce 7-{3-[2-(3,4-dihydroxyphenyl)-2-hydroxyethylamino]-propyl}-theophylline.

The present invention relates to novel 7-theophylline derivatives, namely, the racemic and the optically active d and l rotary forms of 7-{3-[2-(3,4-dihydroxyphenyl)-2-hydroxy ethyl-amino]-propyl}-theophylline, as well as their pharmalogically acceptable acid addition salts.

Such compounds are of the formula

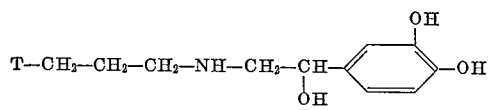

wherein T represents the theophyllinyl-(7)-radical, that is,

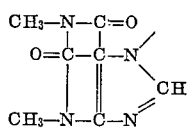

It has been found that these compounds, in addition to having a favorable action on the circulation, possess an extraordinarily high broncholytic action and therefore are useful as broncholytics and as antiasthmatics. Their application can be enteral or parenteral.

In in vivo investigation of bronchial dilation of guinea pigs according to Konzett and Rössler, the ED₅₀ was found to be 0.0005 mg./kg. with intravenous administration and 0.1 to 0.5 mg./kg. with oral administration. In investigation of the antiasthmatic action on non-narcotized guinea pigs according to Kallos and Pagel the ED₅₀, depending upon the substance used to produce the asthmatic condition was 0.04–3 mg./kg. with subcutaneous administration and 1.0–15 mg./kg. with oral administration. Acute toxicity tests with rats indicated an LD₅₀ to 28 mg./kg. with intravenous administration and 162 mg./kg. with intraperitoneal administration. In subacute toxicity tests carried out on rats with daily administrations for 14 days the threshold toxicity was found to be between 15 and 45 mg./kg. when administered by intraperitoneal injection and between 1000 and 2000 mg./kg. when administered orally. The above dosages are based on the hydrochloride salt which was the form administered.

The compounds according to the invention are produced in the best yields by hydrogenation of a compound of the formula

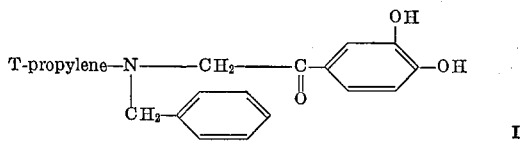

in the presence of a hydrogenation catalyst such as palladium. The compound of the above Formula I is easily prepared from 7-(γ-benzylaminopropyl)-theophylline and 3,4-dihydroxy-ω-chloroacetophenone. The benzylaminopropyl theophylline derivative is easily prepared according to the procedures of German published application 1,011,424 from 7-(γ-chloropropyl)-theophylline and benzylamine. Surprisingly when 7-(γ-aminopropyl)-theophylline is reacted with 3,4-dihydroxy-ω-chloroacetophenone and the resulting ketone is hydrogenated, yields of only about 5 to 10% of theory are obtained whereas when starting with the benzylaminopropyl theophylline compound the yield is 55–75% despite the fact that an additional debenzylation step is required.

The free bases of the compounds according to the invention are easily converted into water soluble pharmaceutically acceptable acid addition salts with acids, such as, hydrochloric acid, hydrobromic acid, sulfuric acid, phosphoric acid, acetic acid, lactic acid, tartaric acid, citric acid, glutonic acid, succinic acid, maleic acid and fumaric acid.

The following example will serve to illustrate the method of producing the racemic as well as the optically active forms of 7-{-3[2-(3,4-dihydroxyphenyl)-2-hydroxyethyl-amino]-propyl}-theophylline.

Example

A solution of 76 g. of 3,4-dihydroxy-ω-chloroacetophenone in 460 ml. of ethanol was added gradually over a period of 2 hours to a solution of 300 g. of 7-(γ-benzylamino-propyl)-theophylline in 920 ml. of ethanol while stirring the mixture under a nitrogen stream at 80° C. After all of the acetophenone solution had been added the mixture was stirred for a further 3 hours at the same temperature. Thereafter 2.4 liters of ethanol were added and the mixture acidified with concentrated HCl. After 48 hours' standing the 7-{3-[2-(3,4-dihydroxyphenyl)-2-oxo-ethyl-benzylamino]-propyl}-theophylline hydrochloride which had crystallized out was filtered off and washed with water and ethanol. Yield=164 g. Melting point=240–243° C. The excess 7-(γ-benzylaminopropyl)-theophylline can be recovered from the mother liquor by boiling it down, alkalizing it with NaOH and shaking out with chloroform. The hydrochloride product was converted to the free base with dilute aqueous ammonia and 139 g. thereof were hydrogenated in a mixture of 2.5 liters of H₂O and 1 liter of methanol with 7 g. of a 10% palladium-carbon hydrogenation catalyst at 55° C. When the hydrogen take up ceased the reaction mixture was filtered and the filtrate hydrogenated again after addition of a further 7 g. of the palladium catalyst. Upon completion of the second hydrogenation, the reaction mixture was filtered and concentrated under vacuum to a volume of about 1.5 liters. The concentrated mixture was placed in a refrigerator over night and the solid product filtered off. It was then purified by boiling out with 0.75 liter of ethanol. Yield: 91.5 g. of racemic 7-{3-[2-(3,4-dihydroxyphenyl)-2-hydroxy-ethylamino] - propyl} - theophylline-hydrochloride of a melting point of 217–218° C.

The free base was prepared therefrom by adding dilute ammonia to an aqueous solution of the HCl salt. The free base which crystallized out melted at 98–100° C. with decomposition.

The optically active l-form was recovered by taking 45.6 g. of the racemic free base, mixing it with 1 liter of distilled water and adding a solution of 19.4 g. of l-tartaric acid in 500 ml. of distilled water, heating the resulting mixture to 60° C. until a clear solution was obtained, allowing the solution to stand for 3 days at room temperature, filtering off the precipitate and washing it with distilled water. After two recrystallizations from distilled water 28 g. of the l-tartarate were obtained which were dissolved in 240 ml. of distilled water with subsequent addition of 26 ml. of 10% HCl. The next day the precipitate was filtered off and boiled up with ethanol and filtered off again after cooling. 20.5 g. of the 1-7-{3-[2-(3,4-dihydroxyphenyl) - 2 - hydroxyethylamino-]propyl}-theophylline hydrochloride of a melting point of 221–222° C. were obtained.

$$[\alpha]_{4050}^{20} = -6.10°$$

The d-form was analogously recovered using d-tartaric acid instead of l-tartaric acid. The HCl salt of the d-form had a melting point of 222° C.

$$[\alpha]_{4050}^{20} = +6.15°$$

The extraordinarily high broncholytic action of the racemic and the optically active d- and l-forms of the 7-{3-[2-(3,4-dihydroxyphenyl) - 2 - hydroxy-ethylamino] propyl}-theophylline (A) is illustrated by comparing the broncholytic activity of the hydrochloride salts thereof with that of the hydrochloride salts of 7-{3-[2-(3,4-dihydroxyphenyl) - 2 - hydroxy-ethylamino]-ethyl}-theophylline (B) given in the following table:

| Compound: | Broncholytic activity (papaverine=1) |
|---|---|
| A: | |
| Racemic | 7500 |
| l-form | 8000 |
| d-form | 6900 |
| B: | |
| Racemic | 0.77 |
| l-form | 1.00 |
| d-form | 0.3 |

The broncholytic activity was determined on the tracheal preparation of a guinea pig with a histamine induced spasm. It will be seen that the broncholytic activity of the compounds according to the invention is 6900 to 8000 times greater than that of papaverine and some 8000 to 23,000 times greater than that of the corresponding compounds of compound B which only differs from compound A in that ethylene replaces the propylene attached to the theophylline radical.

I claim:

1. A compound selected from the group consisting of racemic 7-{3-[2-(3,4-dihydroxyphenyl)-2-hydroxy-ethylamino]-propyl}-theophylline, its optically active d and l forms and the pharmaceutically acceptable acid addition salts thereof.

2. A compound according to claim 1 in its dextro rotary form.

3. A compound according to claim 1 in its levo rotary form.

References Cited

FOREIGN PATENTS 1,119,868  12/1961  Germany.

NICHOLAS S. RIZZO, *Primary Examiner.*

R. GALLAGHER, *Assistant Examiner.*